Sept. 1, 1964 D. EOLKIN ETAL 3,147,173
METHOD OF PREPARING A FOOD PRODUCT
Filed June 9, 1960
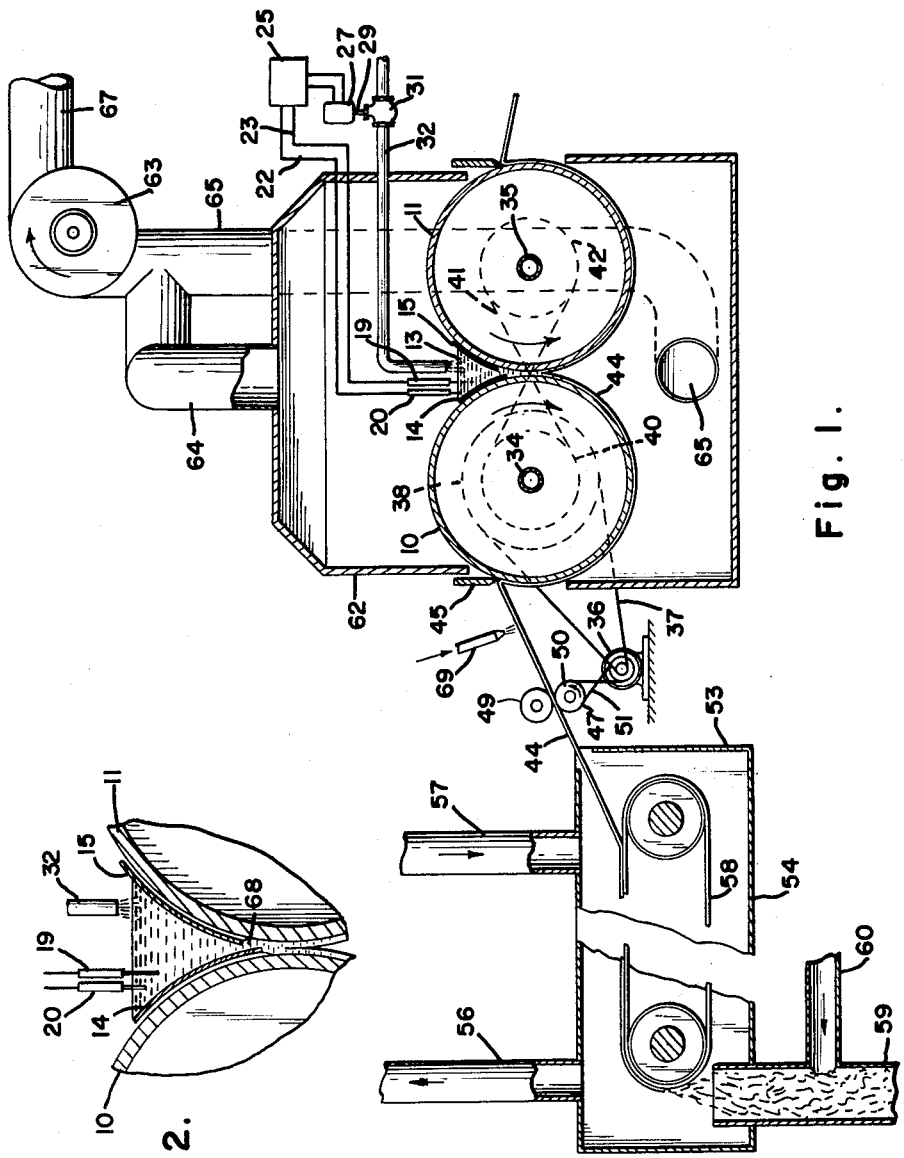
INVENTORS
Dave Eolkin
Eugene R. Allard
Louis H. Anderson
John R. Lovasz
BY
Townsend and Townsend
attorneys United States Patent Office 3,147,173
Patented Sept. 1, 1964

3,147,173
METHOD OF PREPARING A FOOD PRODUCT
Dave Eolkin, Eugene R. Allard, Louis H. Anderson, and John R. Lovasz, all of Oakland, Calif., assignors to Gerber Products Company, Fremont, Mich.
Filed June 9, 1960, Ser. No. 35,011
2 Claims. (Cl. 159—12)

This invention relates to an apparatus and a process for the drying of heat sensitive high sugar content foods, such as fruit and the like, to produce a brittle, readily disintegratable sheet of exceptionally low moisture content from which an instant reconstitutable food product is prepared.

A commercially acceptable dry food product must be capable of being instantly reconstituted with the addition of water leaving no residual lumps. This requires a product in the form of fine particles or flakes that have little or no tendency to cake. The prime cause of caking is excessive water content. A successful process for the preparation of dried instant foods is therefore one which produces a very dry food in small particle form. These may be kept in a hermetically sealed package until used.

The drying of fruit and similar high sugar content foods of delicated flavor to obtain a suitably dry, brittle product without impairment of flavor has proved to be a difficult task. The drying of these foods is, in effect, a paradox. On the one hand, efficient water removal requires high heat and/or lengthy contact between the product and the heat. On the other hand, non-impairment of flavor requires relatively low heat and as short a contact time with the heat as possible. The present invention provides a unique apparatus and process for drying high sugar content foods to a suitably low moisture content level without appreciable impairment of flavor.

The drying of cereals and similar low sugar content foods has been conventionally practiced with internally heated drum driers. Conventional driers of this type comprise a pair of closely spaced drums. The cereal or other food in a liquid form is supplied to a puddle contained in the space between the upper adjacent surfaces of the two drums. The drums at their adjoining surfaces rotate downwardly, and each removes a thin film of the puddle contents on its outer surface. Drying of the thin film continues throughout the interval that the sheet is in contact with the heated drum surface, and in the instance of a cereal product, the film sheet is fully dried by the time it contacts a doctor blade or knife placed near the top of each drum. The doctor blade peels the dried cereal film from the drum surface, and it is then passed to a flaker or other disintegrator.

Merely lowering the drying temperature, i.e. the temperature of the heated drum surface, to a range that forestalls flavor impairment in fruit, results in a film sheet too plastic for flaking and too wet to avoid subsequent caking even if it were placed in a flakable form, for instance by cooling.

It is an object of this invention to provide a suitable apparatus for drying fruit and other heat sensitive high sugar content foods. A further object is to provide a process for drying such heat sensitive foods. A still further object is to provide a process and apparatus for drying fruit and similar food products and thereby remove substantially all water without damaging the flavor of the dried product. These and other objects will become more apparent with the reading of the following disclosure.

In accordance with the invention there is provided a suitable apparatus for drying heat sensitive high sugar content food. Broadly stated, the elements of the apparatus include a rotatable drum drier provided with a heated outer surface. In combination with the drum drier, the remaining elements comprise means for holding food in liquid form out of physical contact with the heated surface of the drum drier. This means for holding the food is adapted for supplying an adjustable quantity of the food to the heated surface of the drum drier as the drier is rotated. The food is thereby applied to the drum drier in the form of a film. While this film is being dried, there is provided means for continuously removing the moistened atmosphere produced above and below the heated surface of the drum drier. When the food has been dried to a type of plastic sheet, means associated with the drum drier for removing the food from the heated surface, are employed to remove the food. Means for transporting the removed food sheet away from its point of removal are provided. This transportation means carries the food sheet to terminal drying means adapted for removing moisture left in the food by the drum drier.

Other objects of the invention will become apparent upon reading the following specification and referring to the accompanying drawings in which similar characters of reference represent corresponding parts in each of the several views.

FIG. 1 is a side view, partly in cross-section, illustrating a preferred embodiment of an apparatus suitable for preparing dried food having the requisite properties; and
FIG. 2 is a partial sectional view showing the tandem drums and the false puddle.

With reference to the drawing, there is shown a drum drier of the type utilizing two adjacent, internally heated rotatable drums 10, 11, that are closely spaced in parallel disposition to each other with their axes of rotation at the same level. The two drums stop just shortly of actually contacting each other. The space between their closest surfaces is known as the "nip." The invention is not to be limited to drum driers of the type illustrated but is generally applicable to all rotatable drum driers provided with a heated outer surface.

The food in liquid form does not flow freely through the nip, and it is only with the downward rotation of the adjacent drum surfaces that the food leaves the nip in a thin film on each of the drums. The drum drier illustrated differs in construction from the usual drier in that the food in liquid form is supplied to the nip from a "false puddle" contained in an elongated trough 13 shown in cross-section. The false puddle is described in a copending application Ser. No. 34,705, filed June 8, 1960, now Patent No. 3,115,433. In conventional design the puddle is held in direct contact with the upper adjacent surfaces of the two drums. The conventional arrangement has a prohibitive disadvantage against its use in the processing of a heat sensitive material like fruit due to its tendency to expose some of the puddle's content to heat for relatively long periods of time while awaiting application to the drums for drying. This results in an undesirably excessive heating of the food with concomitant impairment of the flavor. The trough 13 eliminates this disadvantage by holding the food out of physical contact with the drum surfaces until immediately preceding its application to the drum surfaces for drying.

The false puddle has yet another major advantage. When the drums enter the region of a conventional puddle, they are cooled to a certain extent by the liquid in contact with them. Upon leaving the puddle and having picked up food to be dried, the steam within the drums must necessarily reheat the drums. With the false puddle, this effect is highly diminished allowing higher production rates and a uniformly dried product.

The elongated trough may be of the same length as the two underlying drums and is disposed in the space above the nip of these drums. The trough is shaped so as to present a downwardly decreasing cross-section. The trough 13 has two end members 17 attached to one fixed side member 14 and one slidably attached side member 15 for regulating the width of a slot 68 formed between the converging edges of the two side members 14 and 15.

The trough 13 is provided with a level controller for maintaining the height of the food within the trough. Two sensing probes 19, 20 are spaced apart with the terminal end of one somewhat lower than the end of the other. The probes are connected via wires 22, 23 to the controller 25. With the fall of the level of the puddle below the predetermined setting, the circuit completed through the two sensing probes and liquid is broken and this occurrence causes the controller 25 to energize and electric motor 27 which through suitable mechanical linkage 29 positions valve 31 of a line 32. Flow of food in liquid form through the valve 31 and line 32 restores the puddle level of the trough.

Steam to heat the two drums may be conveniently provided through pipes 34, 35 which also serve as the axles which support the bearings (not shown) about which the drums 10, 11 rotate. The two pipes 34, 35 are perforated along their lengths to provide access for the steam to the interiors of the drums.

Various arrangements may be employed for driving the drums. In the arrangement shown, an electric motor 36 is connected by an endless belt or chain 37 to a pulley 38 fixed to the axle of drum 10. The axle of this drum carries a second pulley 40 of reduced diameter which is coupled through a second belt 41 to a pulley 42 of the same diameter mounted on the axle of the other drum 11. This second belt crosses itself and thus imparts an opposite direction of rotation to drum 11.

The thin film 44 of food formed on the downwardly rotating drum 10 is carried around the bottom side of the drier and upwardly into contact with a long doctor's knife 45 which peels the film in the form of a plastic sheet from the drum. The food film may be removed as a plastic sheet in a continuous operation for further processing. It is important to adjust the temperature of the drum surface by regulating the steam pressure interiorly, and/or controlling the rate of rotation of the drums so that the food film maintains contact with the heated surface for a time sufficient to significantly reduce the moisture content of the food film but, when working with fruit purée, does not subject the product to temperatures in excess of about 250° F.

Avoidance of flavor impairment is also made possible by another important feature of the apparatus shown in the drawing. This feature is the enclosure of substantially the entire drum driers by a shell 62. The shell has two ducts 64, 65 originating above and below the axes of rotation of the drums. Duct 64 originates on the top side of the shell while duct 65 originates in the lower portion of the shell below the nip of the drums. Prior art drum driers provide, if any at all, means for removal of atmosphere above the drums only. The ducts are provided with a suction fan 63 and an exhaust conduit 67 on the exhaust side of the suction fan. This feature provides a means for the continuous evacuation of the moist atmosphere produced within the shell while the food sheet is being dried on the drums. Drawing moist air from both above and below the drums at the same time is responsible for highly efficient and rapid drying on the drums. It permits use of lower temperatures and less drying time on the drums.

The film sheet is removed from the drum under tension supplied by a ringer member 47 formed of two rollers 49, 50. The upper roller is an idler, spring loaded downwardly into contact with the lower driven roller which is connected through a belt 51 to the beforementioned motor 36. The driven roller 50 of the ringer is geared to move the food sheet at substantially the speed at which the drum surface moves. The tension supplied to the sheet by the ringer forestalls creping or bunching together of the food sheet in its removal from the drum. Optionally, a cool air stream from the nozzle 69 cools the sheet making it stronger and more manageable, also helping to reduce creping of the plastic sheet.

The food sheet 44 is transferred by the ringer to a tunnel drier 53 which comprises an elongated shell 54. Two ducts 56, 57 open into the top side of the enclosure 54 at its opposite ends. Dehumidified warm air is supplied to the tunnel drier by duct 57 and spent air is removed through duct 56. An endless conveyor belt 58 of the width of the food sheet is disposed within the tunnel drier. The conveyor belt transports the food sheet through the tunnel drier. The dried sheet is transported, as at 59, to a flaker (not shown) and subsequent processing. Further drying may be supplied by a warm air stream furnished by a conduit 60 if so desired.

The terminal drying zone comprises an elongate shell or tunnel drier provided with a continuous conveyor and spaced conduits and is illustrative of a means for furthering the proper drying of product. Since the plastic food sheet still contains moisture when it leaves the drum drier, it is only through the final measure of moisture removal contributed by the terminal dryer that the food sheet attains a sufficient degree of brittleness to permit its disintegration into suitably small particles and is insured against subsequent caking. It is the cooperative drying effort of this terminal dryer that permits temperatures to be reduced on the drum driers below that required for complete drying of the food, thereby avoiding flavor impairment. Thus, it will be seen that the objects of this invention are accomplished through combination of plural drying stages.

The practice of the process of the present invention is carried out by first preparing a purée of the fruit or other food to be dried. Any of the known methods of preparing a purée may be used and may include the use of an additive stiffening agent such as tapioca, starch, pectin or the like. Addition of a stiffening agent improves the handleability of the plastic sheet throughout the drying process.

A properly prepared fruit purée may then be dried by continuously supplying the purée at a controlled rate to a drum drier surface while holding the balance of the purée to be dried out of physical contact with the heated surface. The atmosphere surrounding the drying surfaces are continuously evacuated while permitting the food to maintain contact with the heated surface for a time sufficient to significantly reduce the moisture content of the purée. The purée is thereby dried to a type of plastic sheet. The process is completed by removing the food sheet from the rotating surface in the form of a sheet, transporting it away from the point of removal by exerting a positive drawing force on the sheet, introducing the sheet into a terminal drying zone and contacting it with a stream of warm air and low moisture content to further dry the sheet to a brittle condition permitting flaking into small particles.

Although the foregoing invention has been described in some detail by way of illustration and example for purposes of clarity of understanding, it is understood that certain changes and modifications may be practiced within the spirit of the invention and scope of the appended claims.

In the claims:

1. In an apparatus for drying heat sensitive high sugar content food, the combination with a drum drier of the type having two closely spaced parallel rotatable drums that form a nip between their closest surfaces and provide with heated outer surfaces and means to rotate the drums in opposite direction comprising an elongate trough of downwardly decreasing cross-section having two end members attached to one fixed side member and one slidably attached side member for regulating the width of a slot formed between the converging edges of the two side members, said trough being of a length substantially equal to the length of the drums and disposed in the space above the nip of the drums, said trough being provided with a level controller for maintaining the level of food in liquid form supplied to the trough at a pre-set level, said trough supplying a continuous flow of the food through the slot to the nip of the drums as the drums rotate whereby said food is applied to the heated surfaces in the form of a uniform film, said entire drum drier being substantially enclosed by a shell having ducts originating inside the shell above and below the nip of the drums, an exhaust blower in combination with said ducts to cause moistened air produced while the food is being dried to be removed from within the shell, doctor blades associated with the drum drier for scraping the food from the heated surfaces after it has dried to a type of plastic sheet, at least one pair of adjacent, tension inducing removal rollers spaced from one of the rotatable drums and aligned with a doctor blade to receive the plastic sheet of food therebetween, at least one of the pair of rollers being driven so as to assert a positive drawing force on the food sheet freed from the drum, at least one air nozzle placed between the drying drums and the removal rollers for directing a stream of cooling air on the food sheet as it leaves the drum, and a terminal drying enclosure comprising an elongate tunnel drier having spaced conduits for supplying heater air of relatively low moisture content and for removing said air after circulation within the shell, and an endless conveyor disposed within the shell adapted to receive the food sheet from the removal rollers and transport it through the shell whereby the food is dried to a brittle condition permitting flaking into small particles.

2. A process for drying heat sensitive, high sugar content fruit slurry which comprises continuously supplying said slurry at a controlled rate to a rotating heated surface, continuously evacuating moist atmosphere adjacent said heated surface while permitting the slurry to contact the heated surface for a time sufficient to significantly reduce the moisture content thereof and dry the slurry to a type of plastic sheet, removing the food sheet from the rotating surface in the form of a sheet and without significantly disintegrating the sheet, exerting a positive drawing force on the sheet independent of gravity and sufficient to place tension on the sheet to prevent creping during said removal step and to transport the sheet away from the point of removal, subjecting the sheet to cooling gas while exerting the positive drawing force thereto at a point substantially median the point of removal of said sheet from said heated surface and point of applied force, then introducing and moving the sheet into and through an enclosed terminal drying zone while contacting the sheet with a supplemental pretreated drying gas operable to dry the sheet to a condition compatible with flaking and packaging.

References Cited in the file of this patent

UNITED STATES PATENTS

| | | |
|---|---|---|
| 592,906 | Gere | Nov. 2, 1897 |
| 834,516 | Gathmann | Oct. 30, 1906 |
| 849,003 | Macklind | Apr. 2, 1907 |
| 1,048,463 | Merrell et al. | Dec. 24, 1912 |
| 1,232,032 | Haughey | July 3, 1917 |
| 1,286,538 | Coleman | Dec. 3, 1918 |
| 1,318,464 | Schweizer | Oct. 14, 1919 |
| 1,501,514 | Boberg | July 15, 1924 |
| 1,851,309 | Heath | Mar. 29, 1932 |
| 2,308,034 | Van Derhoef | Jan. 12, 1943 |
| 2,352,220 | Overton | June 27, 1944 |
| 2,413,779 | Ormond | Jan. 7, 1947 |
| 2,748,849 | Hart | June 5, 1956 |
| 2,903,054 | Fischer | Sept. 8, 1959 |

FOREIGN PATENTS

| | | |
|---|---|---|
| 349,337 | Germany | Feb. 28, 1922 |
| 55,989 | Netherlands | Mar. 15, 1944 |